United States Patent [19]

Takahashi et al.

[11] 3,970,718

[45] July 20, 1976

[54] METHOD OF PRODUCING POLYMER COMPOSITIONS BASED ON CHLORINATED POLYETHYLENE

[75] Inventors: Akira Takahashi, Megurizawa; Hiroo Kojima, Seki; Masao Ogawa, Minami-Karasuyama; Hiroshi Osuka, Yokohama; Shoichi Kobayashi, Tokyo, all of Japan

[73] Assignee: Showa Denko Kabushiki Kaisha, Tokyo, Japan

[22] Filed: Jan. 28, 1975

[21] Appl. No.: 544,706

Related U.S. Application Data

[60] Division of Ser. No. 134,826, April 16, 1971, Pat. No. 3,887,648, which is a continuation-in-part of Ser. No. 784,517, Nov. 22, 1968, Pat. No. 3,673,279, which is a continuation-in-part of Ser. No. 339,899, Jan. 24, 1964, Pat. No. 3,406,251.

[52] U.S. Cl. ..................... 260/876 R; 260/878 R; 260/DIG. 14
[51] Int. Cl.² ................ C08L 51/00; C08L 53/00
[58] Field of Search ................... 260/876 R, 878 R

[56] References Cited
UNITED STATES PATENTS

| | | | |
|---|---|---|---|
| 3,496,251 | 2/1970 | Takahishi et al. | 260/878 R |
| 3,558,745 | 1/1971 | Ogawa et al. | 260/878 R |
| 3,887,648 | 6/1975 | Takahishi et al. | 260/878 R |

*Primary Examiner*—Richard B. Turer
*Attorney, Agent, or Firm*—Sherman & Shalloway

[57] ABSTRACT

In a method for producing a polymer composition by contacting

A. a polymer component selected from the group consisting of chlorinated polyethylene and a mixture consisting of a major amount of chlorinated polyethylene and a minor amount of copolymer selected from an ethylene-propylene copolymer rubber an, ethylene-propylene-nonconjugated diene terpolymer rubber and an ethylene-vinyl acetate copolymer rubber, with B. a monomer mixture comprising.
  $b_1$. at least one of styrene, alpha-methyl styrene, tertiary butyl styrene and chlorostyrene, and
  $b_2$. at least one of acrylonitrile and methacrylonitrile under polymerization conditions to form an interpolymer of the components (A) and (B), the improvement which comprises suspending polymer component (A) and monomer component (B) in the form of fine particles in an aqueous medium.

15 Claims, No Drawings

METHOD OF PRODUCING POLYMER COMPOSITIONS BASED ON CHLORINATED POLYETHYLENE

This application is a division of Ser. No. 134,826, filed Apr. 16, 1971 now U.S. Pat. No. 3,887,648 which is a continuation-in-part of copending application Ser. No. 784,517 filed Nov. 22, 1968 now U.S. Pat. No. 3,673,279, which application is a continuation-in-part of application Ser. No. 339,899 filed Jan. 24, 1964, now U.S. Pat. No. 3,406,251.

This invention relates to a new method of producing chlorinated polyethylene-based polymer compositions possessing excellent properties.

The polymer compositions obtained in accordance with the invention method comprehend the interpolymers based on chlorinated polyethylene and the blended compositions of such interpolymers with other polymers. These compositions all possess conjointly the desirable properties such as excellent impact strength, weatherability, resistance to attack by chemicals, flame resistance, resistance to soiling as well as good processability and other properties which will be described hereinafter, thus making these compositions highly suitable for molding purposes.

A particular feature of the invention method resides in the fact that an interpolymer is formed by contacting under polymerization conditions the starting materials, i.e., the base polymer and the monomer components, which are in a state of suspension separately in the same aqueous medium and, in addition, in that this operation can be carried out commercially very smoothly and with great efficiency.

An object of the present invention is therefore to provide a new and commercially valuable method of producing polymer compositions. Another object is to provide polymer compositions which possess excellent properties as resins for molding purposes. Other objects and advantages will become apparent from the following description.

The method of producing the interpolymers according to the invention will be first described.

A number of methods of producing interpolymers have been known in the past. The production of an interpolymer is usually carried out by the technique known as graft polymerization, i.e., a method of polymerizing a monomer or monomers on a trunk polymer. The polymer which has been formed in this manner is usually referred to as a graft copolymer. However, strictly speaking, this is a homogeneous polymer composition comprising an intimate mixture of the copolymer consisting of a trunk polymer having a monomer grafted thereon, the base polymer used as the trunk polymer, and the homopolymers of monomer or monomers which have been used; i.e., this is an interpolymer. What is referred to herein as an interpolymer or graft copolymer is meant to be such a homogeneous polymer composition.

The techniques of graft polymerization which have been known heretofore include such methods as the bulk, solution, emulsion and suspension polymerization methods as well as two-stage polymerization method which consists of a suitable combination of two of the foregoing methods. The shortcomings of these conventional methods are outlined below.

In the bulk polymerization method, a requisite condition is that the trunk polymer used must be soluble in the monomer. Therefore, the degree to which the trunk polymer is soluble in the monomer imposes a restriction on the proportion in which the two components are used and the polymerization operation. Again, when the velocity of the solution is very high, the agitation thereof as well as the control of the polymerization temperature resulting from the influence of the reaction heat is not only difficult, but also since the resulting polymer frequency contains a considerable amount of residual monomers and its complete removal is difficult, this causes degradation of the quality of the product.

While the shortcoming of the aforesaid bulk polymerization is not seen in the case of the solution polymerization method, it has instead disadvantages which are very great from the standpoint of commercial operations in that there is the need for a recovery operation of the solvent that is used and that a loss of the solvent is involved.

In the emulsion polymerization method a latex of the base polymer must be used. Further, the use of a considerably great amount of an emulsifier and a salting agent for separating the resulting polymer is required. Thus, not only is the operation complicated, but also there is the drawback that the emulsifier and salting agent used remains in the product as impurities.

Since in the suspension polymerization method the polymerization reaction is carried out in an inert medium such as water, the control of the temperature is simple and, in addition, the quality of the resulting product is uniform. However, for forming the suspension system it is necessary to either dissolve the base polymer completely in the monomer or impregnate the former with the latter and effect its homogeneous swelling before the base polymer and monomer are suspended in the medium. Thus, the preliminary steps involved are troublesome. Moreover, it can only be practiced within the limits of the degree of solubility of the base polymer in the monomer. Accordingly a restriction is imposed on the weight ratio in which the two components can be used and therefore does not permit a free choice. Again, even though the ratio of the two components is within the degree of solubility of the polymer, similar difficulties are encountered as in the case with the aforesaid bulk polymerization method when the viscosity of the solution is high.

Thus, as herinabove described, it was necessary in the conventional methods for producing an interpolymer for molding use that the base polymer and monomer were in state where the two components were either mutually dissolved or intimately mixed prior to their being submitted to the polymerization conditions. Further, only by doing this was it possible to obtain the intended interpolymer.

In contradistinction, the method of producing an interpolymer according to the present invention fundamentally comprises contacting the base polymer and monomer under polymerization conditions in a state wherein the two components are separately suspended as fine particles in the same aqueous medium. That is, the base polymer and the monomer are not in either a homogeneously mixed or mutually dissolved state prior to the polymerization reaction. According to the invention method, the particles of the base polymer and the particles of the monomer, which are in suspension in the same aqueous medium, are brought into contact with each other by, stirring, for example and the latter penetrates into the former while being polymerized to thereby complete the formation of a homogeneous interpolymer. That a desirable interpolymer can be obtained by a method such as hereinabove described is truly surprising when compared with the conventional methods.

Various advantages which could not be obtained by the conventional methods are afforded by the present invention such as that equipment and operations for a preliminary dissolving step are unnecessary; that suspension is readily accomplished without encountering any difficulty such as is experienced in suspending a high viscosity solution; and that the ratio in which the two components are contained can be freely chosen without being limited by the degree of solubility of the base polymer in the monomer. Again, there is, of course, no need for using an organic solvent, and the control of the reaction temperature is readily accomplished.

Before describing the base polymer component and the monomer components that are used in the invention method, a preferred mode for forming the interpolymer will be described.

The base polymer component and the monomer components can be suspended in the aqueous medium either at the same time but separately from each other or one after the other. Alternatively, an aqueous suspension of each of the components can be prepared in advance and thereafter the so prepared suspensions can be combined. For obtaining a good suspension, vigorous stirring is performed, and previously a suspension stabilizer or suspending agent is used. The conventional suspension stabilizers, for example, water-soluble high molecular weight compounds such as polyvinyl alcohol, polyalkylene oxide and cellulose derivatives and powders of the difficultly soluble inorganic salts such as calcium carbonate, calcium phosphate are useable and magnesium phosphate. The amount in which the suspension stabilizer is used is suitably from 0.05 to 1 percent based on the weight of the water. While any particle size of the base polymer will do as long as it is of sufficient fineness for forming a suspension, it is preferably of 5–150 Tyler mesh size, and still more preferably of 10–48 Tyler mesh size in view of the stability of the suspension and the quality of the product. The amount of water to be used is suitably 0.8–10 times the total weight of the base polymer component and monomer component used in the polymerization reaction. While the stability of the suspension is maintained as the amount of water increases, the use of about 0.8–3 times is preferred from the standpoint of commercial economy.

The polymerization reaction is carried out in customary manner by the action of heat or the action of a polymerization initiator. It is suitably carried out in the presence of a polymerization initiator and a chain transfer agent. The initiators which are useable are the known organic peroxide type catalysts and the azo compound type catalysts. Especially convenient are the former, examples of which include lauroyl peroxide, tertiary butyl peracetate, tertiary butyl benzoate and benzoyl peroxide. As the chain transfer agent, normal-dodecyl mercaptan, tertiary dodecyl mercaptan and others can be used. From the standpoint of convenience of operation and satisfactory results that are obtained, the polymerization initiator is preferably mixed in advance in the monomer component prior to its suspension in the aqueous medium. In addition to the initiator and the chain transfer agent, additives such as chlorinated paraffin, hardened wax, liquid paraffin and higher fatty acids can be added, if desired, for improving the processability and impact strength of the product. A polymerization temperature in the range of 50°–150°C. is convenient. Various other means that are used in the conventional suspension polymerization method may also be employed.

As a result of operating in the manner hereinbefore described, an interpolymer is obtained according to the invention method, wherein the total amount of the base polymer component and the monomer component used is nearly completely polymerized. The resulting interpolymer ordinarily retains practically the same particulate form as that of the base polymer used as the starting material. No particles of a homopolymer or copolymer consisting of only the monomer component used are formed. The resulting interpolymer can be readily separated from the aqueous medium by means of, filtration, for example. After water-washing, if desired, the particles are dried, thereby obtaining the intended interpolymer as a final product.

The distinctive properties of the base polymer component and the monomer component that are used in the present invention as well as that of the interpolymers obtained therefrom will now be described hereinbelow.

The base polymer component (A) is either chlorinated polyethylene or a mixture comprising a major amount of chlorinated polyethylene and a minor amount of a copolymer selected from an ethylene-propylene copolymer rubber (EPM), a ethylene-propylene-nonconjugated diene terpolymer rubber (EPDM) and an ethylene vinyl acetate copolymer rubber (EVA) (vinyl acetate content 5–60 weight %). On the other hand, the monomer component (B) used is a mixture of two kinds of monomers, one kind of monomer ($b_1$) being selected from styrene, alpha-methylstyrene, t-butyl styrene and chlorostyrene, the other kind of monomer ($b_2$) being selected from acrylonitrile and methacrylonitrile. The interpolymer which is formed by submitting these components (A) and (B) in a specified weight ratio to polymerization conditions in an aqueous suspension system posesses excellent impact strength when used as a thermoplastic molding resin. The weight ratio of the component (A) to component (B) to be employed ranges from 10:90 to 90:10, while the weight ratio of ingredient ($b_1$) to ingredient ($b_2$) is selected from the range 10:90 to 90:10. Generally speaking, the impact strength of the resulting interpolymer becomes greater in proportion as the amount of component (A) becomes greater. On the other hand, the tensile strength of the interpolymer becomes greater in proportion as the amount of component (B) becomes greater. When the interpolymer is to be used as a molding resin, a weight ratio of (A):(B) ranging from 10:90 to 50:50 is most suitable.

As a typical example, first the case where the component (A) is chlorinated polyethylene and component (B) is a mixture of acrylonitrile and styrene will be described. The chlorinated polyethylene is prepared by the chlorination of polyethylene with chlorine. In the invention, a chlorinated polyethylene of a degree of chlorination (weight % content of bonded chlorine) of 10–50 percent, and more preferably of 20–40 percent, is used. Further, since a chlorinated polyethylene obtained by the chlorination of polyethylene having a weight average molecular weight exceeding 100,000 provides an interpolymer having an especially high impact strength, such a chlorinated polyethylene is particularly suitable. The preparation of a desirable interpolymer by the use of a base polymer having such a high molecular weight is only possible in the case where the hereinbefore described invention suspension system technique is used. This is extremely difficult in the case of the conventional solution, bulk and suspension techniques due to the high viscosity that is ascribable to the high molecular weight polymer.

When an interpolymer is to be made as hereinabove described using chlorinated polyethylene as the base polymer (A) and a mixture of acrylonitrile and styrene as the monomer component (B) a most valuable product is provided when the weight ratio of A:B ranges from 10:90 to 90:10, and preferably 10:90 to 50:50, and the weight ratio of acrylonitrile: styrene ranges from 10:90 to 35:65.

The so obtained interpolymer, i.e. a thermoplastic resin, possesses a high impact strength, tensile strength and flexural strength and has good processability and dimensional stability. Furthermore, it excels in weatherability, flame resistance and resistance to soiling.

Heretofore, as thermoplastic three-component polymeric compositions, there are known, for example, those generally referred to as the ABS polymers, which are either copolymers or polymeric or copolymeric mixtures consisting of acrylonitrile, styrene and butadiene. While these ABS polymers and other three-component polymeric compositions of the same class are all comparatively good in their impact strength and dimensional stability, their flame resistance, resistance to burning, weatherability and processability are however not yet quite satisfactory. In contrast, the aforesaid three-component polymeric composition of the present invention does not possess these shortcomings of the ABS polymers. The reason therefor is believed to be due to the fact that in polybutadiene, the base polymer of the ABS resin, a double bond is present which causes the degradation of this resin, whereas such a double bond is not essentially present in the resin of present invention.

As the ingredient (b$_1$) of the monomer component (B), alphamethyl styrene, t-butyl styrene or chlorostyrene can be submitted for all or part of the styrene. By such a substitution a still greater improvement can be had in the thermal stability of the product. Further, methacrylonitrile can be substituted for all or part of the acrylonitrile as the other ingredient (b$_2$).

In preparing an interpolymer by the invention method, a mixture comprising a major amount of chlorinated polyethylene and a minor amount of a copolymer selected from an ethylene-propylene copolymer rubber, an ethylene-propylene-nonconjugated diene terpolymer rubber and an ethylene-vinyl acetate copolymer rubber can be used instead of the aforesaid chlorinated polyethylene. The ethylene-propylene copolymer rubber and the ethylene-propylene-nonconjugated diene terpolymer rubber have been generally well known hitherto as EPM and EPDM, respectively. These are both a rubbery polymer having 35–80 percent by weight of ethylene units and a specific gravity of about 0.83–0.85.

It has been found that by using as the base polymer component EPM, EPDM or EVA in conjunction with the chlorinated polyethylene, an interpolymer having improved low temperature fragility can be obtained when compared with the case where chlorinated polyethylene is used alone. When EPM, EPDM or EVA is merely blended in an interpolymer obtained by the use of chlorinated polyethylene alone, there is an improvement in the low temperature fragility but there is the disadvantage that a marked decline takes place in the impact strength at room temperature. The proportion in which the EPM, EPDM or EVA is contained in the base polymer component is most desirably from 10 to 50 percent by weight.

Thus, as fully described hereinbefore, various desirable thermoplastic polymer compositions can be obtained according to the present invention by a suitable combination of the classes and weight ratios of the base polymer component and the monomer component.

Further, in accordance with the invention, a modified mode of preparing these desirable thermoplastic resin is provided which comprises preparing an interpolymer wherein the amount of base polymer component is great and the amount of monomer component is small, blending with the so obtained interpolymer a homopolymer or copolymer separately prepared from only the monomer component, thereby diluting the proportion contained of the base polymer component to the degree desired. Since the foregoing interpolymer is already incorporated with component (B), its compatibility with the polymer consisting solely of component (B) is high, with the consequence that a homogeneous blend can be readily obtained. The blending can be accomplished in customary manner, using, for example, an extruder, mixer or mixing rolls. For brevity this method is referred to as either the graft-blend procedure or master batch procedure. The properties of the blended composition obtained by this method are about the same as those of an interpolymer whose weight ratio of component (A) to component (B) is identical. The rigidity is rather higher. For carrying out the graft-blend procedure in a desirable manner, an interpolymer master batch is prepared with the weight ratio of component (A) to component (B) ranging from 10:90 to 90:10, following which a separately prepared polymer consisting of only component (B) is blended therewith to form a composition in which the overall weight ratio (A):(B) is in the range of 5:95 to 50:50.

Since in the master batch procedure a master batch of the inter-polymer containing the base polymer component in a high concentration is used and a separately prepared polymer consisting of only the monomer component is blended with the foregoing master batch in varying amounts, as required, thermoplastic resins of various desired grades can be provided. Thus it is convenient and advantageous from the standpoint of commercial production. A method such as described is only possible by the method of producing an interpolymer in a suspension system in accordance with the present invention. In the conventional solution, bulk and suspension polymerization methods, when the concentration of the base polymer component was high, it was impossible to carry out the production for the reason of the limited solubility of the base polymer component in the monomer component. Even when the former was soluble in the latter, the viscosity would become exceedingly high to render the operation difficult to carry out.

If desired, the conventional additives such as a plasticizer, stabilizer, lubricant and others may be added to the interpolymer composition or blended polymer composition obtained by the invention method. For example, if a small amount of a flame retardant such as antimony trioxide, hexabromobenzene, perchloropentacyclodecane and decachlorobiphenyl is incorporated in the invention polymer composition, its good fire resistance can be further enhanced. Since the fire resistance of the conventional ABS resins is generally low, the addition of a flame retardant such as hereinabove described has been attempted to make up for this deficiency. However, since the flame retardant must be added in a considerably large amount to obtain a desirable fire resistance, the various desirable properties which are intrinsically possessed by the ABS resins are greatly impaired. This does not happen in the case of the invention polymer.

In one application of the thermoplastic polymer composition obtained by the invention method, a polymer or copolymer of vinyl chloride is blended therewith. This likewise provides a molding resin which has a desirable impact strength and fire resistance. The polymer or copolymer of vinyl chloride used in this case is the usually available ordinary polyvinyl chloride resin, which is incorporated in the composition in an amount of 10–70 percent by weight, and preferably 15–30 percent by weight. Practically no decline in the properties of the composition was noted as a result of the incorporation of the polyvinyl chloride resin.

The following examples are given for further illustration of the invention. Unless otherwise specified, the parts and percentages in the examples are on a weight basis. The properties of the resulting products were measured in accordance with the following methods:

| Properties | Unit | ASTM |
| --- | --- | --- |
| Impact strength | ft-lb/inch | D256-56T |
| Tensile strength | kg/cm² | D638-58T |
| Elongation | % | D638-58T |
| Flow rate | g/10 min | D1238-57T (190°C, 10 kg) |
| Vicat softening point | °C | D1525-58T |
| Heat distortion temperature | °C | D648-56 |

EXAMPLE I

The components indicated in Recipe (1), below, were charged to a 1-liter autoclave and mixed with stirring to prepare a suspension system.

| Recipe (1) | Parts |
| --- | --- |
| Chlorinated polyethylene powder (weight average molecular weight of the starting polyethylene 150,000, degree of chlorination 30 %) | 24 |
| Polyvinyl alcohol (degree of saponification 95 %) | 0.4 |
| Water (ion-exchanged water) | 100 |

Next, the components of Recipe (2), below, were added and suspended in the foregoing suspension system at room temperature with stirring. This was followed by carrying out the polymerization reaction in an atmosphere of nitrogen for 4 hours at 105°C. and for 2 hours at 145°C.

| Recipe (2) | Parts |
| --- | --- |
| Acrylonitrile monomer | 18 |
| Styrene monomer | 54 |
| Liquid paraffin (lubricant) | 4 |
| Tertiary butyl peracetate (catalyst) | 0.2 |

| Recipe (2) | Parts |
| --- | --- |
| Tertiary decyl mercaptan (chain transfer agent) | 0.2 |

After the resulting polymer was cooled, it was separated from the water, water-washed and dried. Transparent particles of only the styrene-acrylonitrile copolymer could not be seen among the so obtained polymer particles. The particle size distribution of the chlorinated polyethylene before its polymerization and that of the resulting polymer are shown in the following table.

Table 1

| Particle size (mesh) | Starting chlorinated Polyethylene (%) | Resulting polymer (%) |
| --- | --- | --- |
| 10 on | 3 | 3 |
| 10 – 20 | 82 | 77 |
| 20 – 32 | 14 | 17 |
| 32 pass | 1 | 3 |

As is apparent from Table 1, it is believed that the monomeric styrene and acrylonitrile have been polymerized by having been either absorbed or impregnated into the interstices of the chlorinated polyethylene powder, since no appreciable change is noted in the particle size distribution between the starting chlorinated polyethylene and the resulting polymer. Two parts of dibasic lead phosphite were added to the resulting polymer as a stabilizer and then test pieces were made therefrom by pelletizing at 200°C. with a 20-mm extruder. When the impact strength was then measured, it was 11.3 ft-lb/inch Izod-notch (room temperature). Further, the flow rate was 3.0 g/10 min. when measured with a melt indexer. On the other hand, the tensile strength was 345 kg/cm².

Control I

In this experiment the base polymer was dissolved in the monomer, following which the so obtained solution was suspension polymerized.

Components of following recipe were charged to a dissolving tank and dissolved with stirring.

|  | Parts |
| --- | --- |
| Chlorinated polyethylene (weight average molecular weight of the starting polyethylene 150,000, degree of chlorination 30 %) | 12 |
| Styrene monomer | 53 |
| Acrylonitrile monomer | 21 |
| Liquid paraffin | 4 |
| Tertiary butyl peracetate | 0.03 |
| Tertiary dodecyl mercaptan | 0.05 |

Next, the so obtained solution was added to the following suspension system and suspended therein.

|  | Parts |
| --- | --- |
| Water (ion-exchanged water) | 100 |
| Polyvinyl alcohol | 0.4 |

After purging the system with nitrogen, the temperature was raised to 105°C. but during this time aggregation of the suspension took place to convert it into a lumpy mass thereby rendering it impossible to continue the polymerization operation.

Control II

This experiment illustrates the case where the base polymer and a polymer of the monomer were blended.

A chlorinated polyethylene as used in Example I, liquid paraffin and an acrylonitrile-styrene copolymer obtained by polymerizing at the same ratio as in Example I were mixed such that the composition would be identical to that of Example I, after which the mixture was pelletized by extruding from a 20-mm extruder at 200°C. When the properties of this blend were measured as in Example I, the impact strength was 0.9 ft-lb/inch, the flow rate was 2.5 g/10 min. and the tensile strength was 270 kg/cm². Further, when this same composition was blended for 10 minutes at 170°C. with 3-inch rolls, only results which were about the same were obtained.

Thus, the polymer obtained in Example I, above, in accordance with the invention method possesses superior properties as compared with those of a mere mixture of the polymers, and it is believed that the polymer obtained according to the invention method is a partly grafted-copolymerized homogeneous polymer composition.

EXAMPLE II

A polymer was obtained by operating as in Example I, using the Recipes (1) and (2), below.

| Recipe (1) | Part |
| --- | --- |
| Chlorinated polyethylene powder (weight average molecular weight of starting polyethylene 150,000, degree of chlorination 40 %) | 40 |
| Water (ion-exchanged water) | 100 |
| Polyvinyl alcohol (same as that used in Example I) | 0.2 |
| Recipe (2) | Part |
| Styrene monomer | 40 |
| Acrylonitrile monomer | 10 |
| Tertiary butyl peracetate | 0.15 |
| Tertiary dodecyl mercaptan | 0.15 |

The relationship between the particle size of the chlorinated polyethylene prior to its polymerization and that of the product is shown in Table 2, below.

Table 2

| Particle size (mesh) | Starting chlorinated polyethylene (%) | Resulting polymer (%) |
| --- | --- | --- |
| 10 on | 2 | 4 |
| 10 – 20 | 71 | 66 |
| 20 – 32 | 24 | 26 |
| 32 pass | 3 | 4 |

The resulting product was water-washed and dried. Then, after adding 2 parts of dibasic lead phosphite, properties of the product were measured as in Example I. With respect to impact strength, the product did not break by the Izod-notch method at room temperature. The flow rate was 0.3 g/10 min., and the tensile strength was 190 kg/cm².

EXAMPLE III

The experiment was operated as in Example I, using the following Recipes (1) and (2):

| Recipe (1) | Part |
| --- | --- |
| Chlorinated polyethylene powder (weight average molecular weight of starting polyethylene 300,000, degree of chlorination 32 %) | 40 |
| Water (ion-exchanged water) | 200 |
| Polyvinyl alcohol | 0.6 |
| Recipe (2) | Parts |
| Styrene monomer | 40 |
| Acrylonitrile monomer | 10 |
| Mineral oil | 7 |
| Tertiary butyl perbenzoate | 0.1 |
| Tertiary dodecyl mercaptan | 0.1 |

After purging the autoclave with nitrogen, the reaction was carried out for 4 hours at 105°C. and for 2 hours at 140°C., followed by water-washing and drying the reaction product to obtain a polymer.

The relationship between the particle size of the chlorinated polyethylene prior to its polymerization and that of the resulting product is shown in the following table.

Table 3

| Particle size (mesh) | Starting chlorinated polyethylene (%) | Resulting polymer (%) |
| --- | --- | --- |
| 20 on | 9 | 11 |
| 20 – 32 | 22 | 23 |
| 32 – 48 | 67 | 64 |
| 48 pass | 2 | 2 |

Separately, an acrylonitrile-styrene copolymer was prepared with the following Recipe (3).

| Recipe (3) | Parts |
| --- | --- |
| Acrylonitrile monomer | 25 |
| Styrene monomer | 75 |
| Water (ion-exchanged water) | 100 |
| Lauroyl peroxide | 0.4 |
| Tertiary butyl benzoate | 0.05 |
| Tertiary dodecyl mercaptan | 0.3 |
| Tertiary calcium phosphate | 1.0 |
| Anionic surfactant | 0.005 |

The components of the foregoing Recipe (3) were charged to a 5-liter reactor and, after purging the reactor with nitrogen, the reaction was carried out for 4 hours at 80°C. and for 2 hours at 140°C. After completion of the polymerization reaction, the product was washed with water and dried.

The polymeric product obtained by means of Recipes (1) and (2) and the acrylonitrile-styrene copolymer obtained by means of Recipe (3) were blended with a 20-mm extruder. The properties of the resulting polymer composition are shown in Table 4.

Table 4

| Concentration of the chlorinated polyethylene after blending (%) | Impact strength (ft.-lb/ inch notch) | Tensile strength (kg/cm²) | Flow rate (g/10 min.) | Vicat softening point (°C) | Elongation $E_1$ (%) | Elongation $E_2$ * (%) |
| --- | --- | --- | --- | --- | --- | --- |
| 15 | 1.5 | 402 | 7.2 | 105 | 13 | 13 |
| 20 | 1.8 | 355 | 6.0 | 104 | 50 | 41 |
| 25 | 5.4 | 305 | 4.6 | 102 | 73 | 44 |
| 30 | 11.7 | 250 | 3.5 | 99 | 108 | 100 |
| ABS resin ** | 7.9 | 361 | 1.0 | 103 | 31 | 6 |

* Elongation after exposure for 200 hours in a Weather-O-Meter.
** Commercial product (comparison)

The experiment was carried out as hereinabove described, using, however, as the chlorinated polyethylene one whose starting polyethylene was of a weight average molecular weight of 90,000. A polymer composition having the following properties was obtained.

Table 5

| Concentration of the chlorinated polyethylene after blending (%) | Impact strength (ft-lb/inch notch) | Tensile strength (kg/cm²) | Flow rate (g/10 min.) |
| --- | --- | --- | --- |
| 15 | 0.4 | 380 | 16 |
| 20 | 0.5 | 350 | 13 |
| 25 | 1.0 | 285 | 11 |
| 30 | 2.0 | 225 | 8 |

EXAMPLE IV

The experiment was carried out as in Example I, using the following Recipes (1) and (2).

| Recipe (1) | Parts |
| --- | --- |
| Chlorinated polyethylene powder (weight average molecular weight of starting polyethylene 150,000, degree of chlorination 25 %) | 50 |
| Water (ion-exchanged water) | 200 |
| Polyvinyl alcohol | 0.6 |
| Recipe (2) | Parts |
| Styrene monomer | 40 |
| Acrylonitrile monomer | 5 |
| Methacrylonitrile monomer | 5 |
| Mineral oil | 7 |
| Lauroyl peroxide | 0.2 |
| Tertiary butyl benzoate | 0.02 |
| Tertiary dodecyl mercaptan | 0.05 |

After purging the autoclave with nitrogen, the reaction was carried out for 4 hours at 80°C. and for one hour at 140°C. The resulting product was washed with water and dried to obtain a polymer.

The relationship between the particle size of the chlorinated polyethylene prior to its polymerization and that of the resulting product is shown in Table 6, below.

Table 6

| Particle size (mesh) | Starting chlorinated polyethylene (%) | Resulting polymer (%) |
| --- | --- | --- |
| 20 on | 5 | 6 |
| 20 – 32 | 20 | 21 |
| 32 – 48 | 73 | 71 |
| 48 pass | 2 | 2 |

This product and an acrylonitrile-styrene copolymer prepared in accordance with the Recipe (3) given in Example III were blended in amounts such as to result in a chlorinated polyethylene concentration after blending of 23 percent, using a 20-mm extruder. The properties of the so obtained composition are shown as follows:

| | |
| --- | --- |
| Impact strength | 5.0 ft–lb/inch notch |
| Tensile strength | 330 kg/cm² |
| Flow rate | 5.5 g/10 min. |

EXAMPLE V

I contrast to the procedure of Examples I-IV in this experiment a suspension of the starting monomer components was prepared first. Thus, the following monomer components were first charged to a 50-liter autoclave and a suspension system was prepared by mixing the components with stirring.

| | Parts |
| --- | --- |
| Styrene monomer | 28 |
| Acrylonitrile monomer | 7 |
| Mineral oil | 11 |
| Lauroyl peroxide | 0.15 |
| Tertiary butyl perbenzoate | 0.015 |
| Tertiary dodecyl mercaptan | 0.035 |
| Water (ion-exchanged water) | 300 |
| Polyvinyl alcohol | 0.8 |

This was followed by adding 65 parts of a chlorinated polyethylene powder (weight average molecular weight of the starting polyethylene 300,000, degree of chlorination 32 %) to the suspension system. The autoclave was then purged with nitrogen, and the reaction was carried out for 4 hours at 80°C. and then for 1 hour at 140°C. After completion of the reaction, the product was water-washed and dried to obtain a polymer.

The relationship between the particle size of the chlorinated polyethylene before its polymerization and that of the resulting product is shown in Table 7, below.

Table 7

| Particle size (mesh) | Starting chlorinated polyethylene (%) | Resulting polymer (%) |
| --- | --- | --- |
| 20 on | 9 | 11 |
| 20 – 32 | 22 | 21 |
| 32 – 48 | 67 | 65 |
| 48 pass | 2 | 3 |

This product and an acrylonitrile-styrene copolymer prepared in accordance with the Recipe (3) given in Example III were blended in such amounts as to result in a concentration of the chlorinated polyethylene of 28 percent after blending, using a 65-mm extruder. The properties of the so obtained composition are as follows:

| | |
|---|---|
| Impact strength (ft.-lb./inch notch) | 5.7 |
| Tensile strength (kg/cm²) | 265 |
| Flow rate (g/10 min.) | 4.2 |

EXAMPLE VI

The experiment was operated as in Example I, using the following Recipes (1) and (2).

| Recipe (1) | Parts |
|---|---|
| Chlorinated polyethylene powder (weight average molecular weight of starting polyethylene 300,000, degree of chlorination 28 %) | 50 |
| Water (ion-exchanged water) | 200 |
| Polyvinyl alcohol | 0.6 |
| Recipe (2) | Parts |
| Styrene monomer | 34.0 |
| Acrylonitrile monomer | 12.5 |
| Alpha-methyl styrene | 3.5 |
| Stearic acid | 1.0 |
| Tertiary butyl perbenzoate | 0.15 |
| Tertiary dodecyl mercaptan | 0.05 |

After purging the autoclave with nitrogen, the reaction was carried out for 3 hours at 120°C. and for 2 hours at 140°C., the product being then water-washed and dried.

Separately, an acrylonitrile-styrene-alpha-methyl styrene ternary copolymer was prepared in accordance with the following Recipe (3).

| Recipe (3) | Parts |
|---|---|
| Acrylonitrile monomer | 25 |
| Styrene monomer | 68 |
| Alpha-methyl styrene monomer | 7 |
| Water (ion-exchanged water) | 150 |
| Lauroyl peroxide | 0.5 |
| Tertiary butyl benzoate | 0.05 |
| Tertiary dodecyl mercaptan | 0.2 |
| Calcium tertiary phosphate | 1.4 |
| Anionic surfactant | 0.007 |

The components were charged to a reactor and, after purging the reactor with nitrogen, the reaction was carried out for 4 hours at 80°C. and for 2 hours at 140°C. After completion of the polymerization reaction, the product was washed with dilute hydrochloric acid, then water-washed and dried.

The polymeric product obtained previously in accordance with Recipes (1) and (2) and the acrylonitrile-styrene-alpha-methyl styrene ternary copolymer obtained as hereinabove described in accordance with Recipe (3) were blended in such amounts as to result in a chlorinated polyethylene concentration of 10 percent, using a 20-mm extruder.

The properties of the so obtained composition are as follows:

| | |
|---|---|
| Impact strength (ft.-lb./inch notch) | 1.0 |
| Tensile strength (kg/cm²) | 430 |
| Flow rate (g/10 min.) | 0.8 |
| Vicat softening point (°C.) | 115 |

EXAMPLE VII

The experiment was operated as in Example I, using the following Recipes (1) and (2).

| Recipe (1) | Parts |
|---|---|
| Chlorinated polyethylene powder (weight average molecular weight of starting polyethylene 300,000, degree of chlorination 32 %) | 40 |
| Ethylene-propylene-nonconjugated diene terpolymer (tradename ROYALENE 301) | 10 |
| Water (ion-exchanged water) | 200 |
| Polyvinyl alcohol | 0.6 |
| Recipe (2) | Parts |
| Styrene monomer | 35 |
| Acrylonitrile monomer | 12.5 |
| Tertiary butyl styrene | 2.5 |
| Tertiary butyl benzoate | 0.15 |
| Tertiary dodecyl mercaptan | 0.05 |

After purging the autoclave with nitrogen, the reaction was carried out for 3 hours at 120°C. and for 2 hours at 140°C. The resulting product was then water-washed and dried.

Separately, an acrylonitrile-styrene-tert.-butyl styrene ternary copolymer was prepared in accordance with the following Recipe (3).

| Recipe (3) | Parts |
|---|---|
| Acrylonitrile monomer | 25 |
| Styrene monomer | 70 |
| Tertiary butyl styrene monomer | 5 |
| Water (ion-exchanged water) | 100 |
| Lauroyl peroxide | 0.4 |
| Tertiary butyl perbenzoate | 0.05 |
| Tertiary dodecyl mercaptan | 0.4 |
| Calcium tertiary phosphate | 1.0 |
| Anionic surfactant | 0.005 |

The components were charged to a 5-liter reactor and, after purging the reactor with nitrogen, the reaction was carried out for 4 hours at 80°C. and then for 2 hours at 140°C. The resulting product was washed in dilute hydrochloric acid followed by water-washing and drying.

The product previously obtained in accordance with Recipes (1) and (2) and the acrylonitrile-styrene-tert. butyl styrene ternary copolymer obtained hereinabove in accordance with Recipe (3) were blended in amounts such as to result in a total concentration of chlorinated polyethylene and EPT of 27 percent, using a 20-mm extruder.

The properties of the so obtained composition are as follows:

| | |
|---|---|
| Impact strength (ft.-lb./inch notch) | 3.5 |
| Flow rate (g/10 min.) | 2.5 |
| Tensile strength (kg/cm²) | 320 |
| Vicat softening point (°C.) | 104 |

EXAMPLE VIII

The experiment was operated as in Example I, using the following Recipes (1) and (2).

| Recipe (1) | Parts |
|---|---|
| Chlorinated polyethylene powder (weight average molecular weight of | 40 |

| | |
|---|---|
| starting polyethylene 300,000, degree of chlorination 40 %) | |
| Water (ion-exchanged water) | 200 |
| Polyvinyl alcohol | 0.6 |
| Recipe (2) | Parts |
| Styrene monomer | 36 |
| Chlorostyrene monomer | 12 |
| Acrylonitrile monomer | 12 |
| Tertiary butyl benzoate | 0.18 |
| Tertiary dodecyl mercaptan | 0.12 |

After purging the autoclave with nitrogen, the reaction was carried out for 3 hours at 120°C. and for 1 hour at 140°C. The resulting product was then water-washed and dried.

The relationship between the particle size of chlorinated polyethylene before its polymerization and that of the product are shown in Table 8.

Table 8

| Particle size (mesh) | Starting chlorinated polyethylene (%) | Resulting product (%) |
|---|---|---|
| 20 on | 10 | 12 |
| 20 – 32 | 25 | 25 |
| 32 – 48 | 64 | 61 |
| 48 pass | 1 | 2 |

Separately, an acrylonitrile-styrene-chlorostyrene ternary copolymer was prepared in accordance with the following Recipe (3).

| Recipe (3) | Parts |
|---|---|
| Acrylonitrile monomer | 20 |
| Styrene monomer | 60 |
| Chlorostyrene monomer | 20 |
| Water (ion-exchanged water) | 100 |
| Lauroyl peroxide | 0.4 |
| Tertiary butyl perbenzoate | 0.05 |
| Tertiary dodecyl mercaptan | 0.03 |
| Calcium tertiary phosphate | 1.0 |
| Anionic surfactant | 0.005 |

The components were charged to a 5-liter reactor and, after purging the reactor with nitrogen, the reaction was carried out for 4 hours at 80°C. and for 2 hours at 140°C. After washing the resulting product in a dilute acid, it was water-washed and dried.

The product previously obtained in accordance with Recipes (1) and (2) and the acrylonitrile-styrene-chlorostyrene copolymer obtained in accordance with Recipe (3) were blended in amounts such as to result in a chlorinated polyethylene concentration of 27 percent after blending, using a 20-mm extruder.

The so obtained composition had the following properties.

| | |
|---|---|
| Impact strength (ft.-lb./inch notch) | 3.1 |
| Tensile strength (kg/cm$^2$) | 330 |
| Flow rate (g/10 min.) | 2.0 |
| Vicat softening point (°C.) | 103 |

EXAMPLE IX

The experiment was carried out as in Example I, using the following Recipes (1) and (2).

| Recipe (1) | Parts |
|---|---|
| Ethylene-propylene-nonconjugated diene terpolymer powder (tradename ROYALENE 301) | 50 |
| Water (ion-exchanged water) | 200 |
| Calcium tertiary phosphate | 6 |
| Polyvinyl alcohol | 0.6 |
| Recipe (2) | Parts |
| Styrene monomer | 40 |
| Acrylonitrile monomer | 10 |
| Tertiary butyl perbenzoate | 0.15 |
| Tertiary dodecyl mercaptan | 0.05 |

After puring the autoclave with nitrogen, the reaction was carried out for 3 hours at 120°C. and for a further 2 hours at 140°C. The resulting product was then water-washed and dried.

The so obtained product was then blended with the polymer obtained in Example III in accordance with Recipes (1) and (2) and the acrylonitrile-styrene copolymer obtained in Example III in accordance with Recipe (3), using a 20-mm extruder, in amounts such as to result after blending in a composition whose proportion of base polymers are as indicated in Table 9.

Table 9

| Proportion of Base polymers after blending (%) | | Impact strength (ft.-lb./in. notch) | | | Flow rate (g/10 min.) | Tensile strength (kg/cm$^2$) |
|---|---|---|---|---|---|---|
| CPE | EPT | +20°C | −10°C | −30°C | | |
| 27 | 0 | 6.2 | 1.6 | 0.4 | 4.5 | 260 |
| 22 | 5 | 9.0 | 2.8 | 0.7 | 4.1 | 230 |
| 17 | 10 | 7.7 | 3.7 | 1.3 | 3.6 | 215 |
| 0 | 27 | 5.1 | — | 1.4 | 3.4 | 225 |

EXAMPLE X

The experiment was carried out as in Example I, except that the following Recipes (1) and (2) were used.

| Recipe (1) | Parts |
|---|---|
| Ethylene-vinyl acetate copolymer powder (a copolymer containing 17 % of vinyl acetate was comminuted) | 50 |
| Water (ion-exchanged water) | 200 |
| Polyvinyl alcohol | 0.6 |
| Recipe (2) | Parts |
| Styrene monomer | 40 |
| Acrylonitrile monomer | 10 |
| Mineral oil | 7 |
| Tertiary butyl perbenzoate | 0.15 |
| Tertiary dodecyl mercaptan | 0.05 |

After purging the autoclave with nitrogen, the reaction was carried out for 3 hours at 120°C. and 2 hours at 140°C. The resulting product was then water-washed and dried.

The so obtained product was blended with the copolymer obtained with Recipes (1) and (2) in Example III and the acrylonitrile-styrene copolymer obtained with Recipe 3 in Example III in amounts such as to result in a concentration of the chlorinated polyethylene of 17 percent and a concentration of the ethylene-vinyl acetate copolymer of 10 percent, the blending being accomplished with a 20-mm extruder.

The properties of the so obtained composition are shown as follows:

| | |
|---|---|
| Impact strength (ft.-lb./inch notch) | 6.8 |
| Flow rate (g/10 min.) | 4.0 |
| Tensile strength (kg/cm²) | 255 |

EXAMPLE XI

A polymer prepared in accordance with the Recipes (1) and (2) of Example III and an acrylonitrile-styrene copolymer prepared in accordance with Recipe (3) of Example III were blended with polyvinyl chloride and a flame retardant assistant in the proportions indicated in Table 10, using a 20-mm extruder.

The properties of the resulting compositions are shown below.

Table 10

| CPE concentration after blending (%) | PVC concentration (%) | Antimony oxide (%) | Impact strength (ft.-lb./ in. notch) | Flow rate (g/10 min.) | Heat distortion temperature (°C) | Burning Test* |
|---|---|---|---|---|---|---|
| 15 | 20 | 5 | 1.4 | 12.0 | 83 | equal to SE-1 |
| 22.5 | 40 | 0 | 3.8 | 7.8 | 71 | " |
| 22.5 | 50 | 0 | 6.8 | 7.4 | 69 | " |
| 25 | 20 | 5.5 | 3.3 | 7.0 | 79 | " |

*U.S. Underwriters Laboratory standard.

EXAMPLE XII

A polymer prepared in accordance with the Recipes (1) and (2) of Example III, an acrylonitrile-styrene copolymer prepared in accordance with Recipe (3) of Example III and, as flame retardants, hexabromobenzene and antimony trioxide were blended in amounts such as to result in concentrations of the chlorinated polyethylene of 26 percent, of the hexabromobenzene of 12 percent and of the antimony trioxide of 2.5 percent using mixing rolls.

The properties of the so obtained composition are as follows:

| | |
|---|---|
| Impact strength (ft.-lb./in. notch) | 4.3 |
| Tensile strength (kg/cm²) | 290 |
| Flow rate (g/10 min.) | 7.2 |
| Vicat softening point (°C) | 102 |

We claim:
1. A method for producing a blended polymer composition comprising blending
  I. an interpolymer prepared by contacting
    A. a polymer component selected from the group consisting of chlorinated polyethylene of a degree of chlorination of 10–50 percent and a mixture consisting of 50–90 percent by weight of said chlorinated polyethylene and 10–50% by weight of a copolymer selected from an ethylene-propylene copolymer rubber, an ethylene-propylene-nonconjugated diene terpolymer rubber and an ethylene-vinyl acetate copolymer rubber, with
    B. a monomer mixture comprising
      $b_1$. at least one monomer selected from styrene, alpha-methyl styrene, t-butyl styrene and chloro-styrene and
      $b_2$. at least one monomer selected from acrylonitrile and methacrylonitrile
  under polymerization conditions in the presence of a polymerization initiator to form an interpolymer of components (A) and (B) wherein the polymer component (A) and monomer component (B) are suspended in the form of fine particles in a state of separation from each other in an aqueous medium, said component (A) having a particle size of 5–150 Tyler mesh, the weight ratio of said component (A) to component (B) ranging from about 10:90 to about 90:10 with
  II. a polymer separately prepared from said component (B), the overall weight ratio of component (A) to component (B) in said blended copolymer being from 5:95 to 50:50.

2. The method of claim 1 which further comprises blending said composition with (III) an interpolymer prepared by contacting
  A'. a copolymer selected from the group consisting of ethylene-propylene copolymer rubber, ethylene-propylene-nonconjugated diene terpolymer rubber and ethylene-vinyl acetate copolymer rubber, with
  B'. a monomer mixture comprising
    $b_1'$. at least one monomer selected from styrene, alpha-methylstyrene, t-butyl styrene and chloro-styrene, and
    $b_2'$. at least one monomer selected from acrylonitrile and methacrylonitrile
  under polymerization conditions in the presence of a polymerization initiator to form an interpolymer of components (A') and (B'), wherein said copolymer component (A') and monomer component (B') are suspended in the form of fine particles in a state of separation from each other in an aqueous medium, said component (A') having a particle size of 5–150 Tyler mesh, the weight ratio of said component (A') to component (B') ranging from about 10:90 to about 90:10.

3. A method of preparing a polymer composition which comprises blending (I) an interpolymer prepared by contacting
  A. a polymer component selected from the group consisting of chlorinated polyethylene of a degree of chlorination of 10–50 percent and a mixture consisting of 50–90 percent by weight of said chlorinated polyethylene and 10–50 percent by weight of copolymer selected from an ethylene-propylene copolymer rubber, an ethylene-propylene-conconjugated diene terpolymer rubber and an ethylene-vinyl acetate copolymer rubber with B. a monomer mixture comprising
   $b_1$. at least one monomer selected from styrene, alpha-methyl styrene, t-butyl styrene and chlorostyrene and
   $b_2$. at least one monomer selected from acrylonitrile and methacrylonitrile under polymerization conditions in the presence of a polymerization initiator to form an interpolymer of components (A) and (B) wherein the polymer component (A) and monomer component (B) are suspended in the form of fine particles in a state of separation from each other in an aqueous medium, said component (A) having a particle size of 5–150 Tyler mesh, the weight ratio of said component (A) to component (B) ranging from about 10:90 to about 65:35 with (II) from about 10–70 percent by weight based on the total composition of a polyvinyl chloride resin.

4. The method of claim 1 wherein the weight ratio of component (A) to component (B) in the interpolymer (I) ranges from 10:90 to 65:35.

5. The method of claim 1 wherein said polymerization initiator is mixed in said component (B) prior to its suspension in the aqueous medium.

6. The method of claim 1 wherein the polymerization temperature ranges from 50°C to 150°C.

7. The method of claim 1 wherein said chlorinated polyethylene of component (A) is a polyethylene of a weight average molecular weight exceeding 100,000, which has been chlorinated to a degree of chlorination of 10–50 percent.

8. The method of claim 1 wherein said aqueous medium is used in an amount of 0.8 to 10-fold the total weight of said components (A) and (B).

9. The method of claim 1 wherein the weight ratio of component (A) to component (B) in the interpolymer (I) ranges from 10:90 to 50:50.

10. The method of claim 1 wherein the weight ratio of component ($b_1$) to component ($b_2$) ranges from 10:90 to 90:10.

11. The method of claim 1 wherein ($b_1$) is styrene and ($b_2$) is acrylonitrile and the ratio of ($b_1$) to ($b_2$) ranges from 10:90 to 35:65.

12. The method of claim 1 wherein component (A) is a mixture consisting of 50–90 percent by weight of said chlorinated polyethylene and 10–50 percent by weight of a copolymer selected from an ethylene-propylene copolymer rubber, an ethylene-propylene-nonconjugated diene terpolymer rubber and an ethylene-vinylacetate copolymer rubber.

13. The method of claim 1 wherein said component (A) has a particle size of 10–48 Tyler Mesh.

14. The method of claim 3 which contains about 15–30 percent by weight based on the total composition of said polyvinyl chloride resin.

15. The method of claim 3 wherein said polymerization initiator is mixed in said component (B) prior to its suspension in the aqueous medium.

* * * * *